(12) United States Patent
Litterello

(10) Patent No.: US 9,609,100 B2
(45) Date of Patent: Mar. 28, 2017

(54) TABLETOP MOBILE DEVICE AND BEVERAGE HOLDER

(71) Applicant: John Nicholas Litterello, Melbourne, FL (US)

(72) Inventor: John Nicholas Litterello, Melbourne, FL (US)

( * ) Notice: Subject to any disclaimer, the term of this patent is extended or adjusted under 35 U.S.C. 154(b) by 0 days.

(21) Appl. No.: 15/055,798

(22) Filed: Feb. 29, 2016

(65) Prior Publication Data
US 2017/0064057 A1 Mar. 2, 2017

Related U.S. Application Data

(60) Provisional application No. 62/211,247, filed on Aug. 28, 2015.

(51) Int. Cl.
A47B 97/04 (2006.01)
H04M 1/11 (2006.01)
A47G 23/02 (2006.01)

(52) U.S. Cl.
CPC ........... *H04M 1/11* (2013.01); *A47G 23/0216* (2013.01)

(58) Field of Classification Search
USPC ........................................................ 248/450
See application file for complete search history.

(56) References Cited

U.S. PATENT DOCUMENTS

| 701,010 A * | 5/1902 | Behrens | A47B 19/06 248/457 |
| 2,640,595 A * | 6/1953 | Byford | B60N 3/103 108/44 |
| 3,381,876 A * | 5/1968 | Biggins | A47G 23/06 206/229 |
| 3,475,052 A * | 10/1969 | Kaposi | A47B 23/02 248/456 |
| 4,927,024 A * | 5/1990 | Lloyd | A47D 1/008 206/562 |
| 4,981,217 A * | 1/1991 | Lim | A47G 23/06 206/561 |
| 5,372,403 A * | 12/1994 | Puerto | A47C 1/03 297/145 |
| 5,460,102 A * | 10/1995 | Pasmanick | A47B 23/002 108/25 |
| 5,511,755 A * | 4/1996 | Spykerman | B60N 3/108 220/23.8 |
| 6,142,140 A * | 11/2000 | Shumaker | A47J 37/0786 108/152 |

(Continued)

*Primary Examiner* — Monica Millner
(74) *Attorney, Agent, or Firm* — Dunlap Bennett & Ludwig PLLC

(57) ABSTRACT

A retaining apparatus for propping an electronic mobile device in an upright orientation is provided. The retaining apparatus has two planar and opposing surfaces, wherein each surface provides an isosceles-trapezoidal slot. Though the two slots have different widths and lengths, they both provide tapering sidewalls that overhang bottom portions of the associated slot, thereby adapting each slot to selectively engage a peripheral edge of a mobile electronic device between the tapering sidewalls and the overhanging bottom portions, and in turn enabling the propping of the mobile electronic device in the upright orientation. Adjacent to each slot, the retaining apparatus may provide frictionally engaging material for removably securing a beverage container thereto.

6 Claims, 4 Drawing Sheets

(56) References Cited

U.S. PATENT DOCUMENTS

| | | | | |
|---|---|---|---|---|
| 6,145,906 A * | 11/2000 | Wright | ............... | A47G 19/065 |
| | | | | 206/557 |
| 6,298,793 B1 * | 10/2001 | Turner | ............... | A47D 1/008 |
| | | | | 108/26 |
| 6,412,425 B1 * | 7/2002 | Chen | ............... | B60N 3/005 |
| | | | | 108/44 |
| 6,474,244 B1 * | 11/2002 | Karpinski | ............... | E04H 4/14 |
| | | | | 108/42 |
| 6,748,874 B2 * | 6/2004 | Gawronski | ............... | A47B 23/025 |
| | | | | 108/152 |
| 6,910,429 B1 * | 6/2005 | Matay | ............... | B25H 3/06 |
| | | | | 108/152 |
| 7,043,778 B1 * | 5/2006 | Georgitsis | ............... | A47D 9/00 |
| | | | | 108/49 |
| 7,073,449 B2 * | 7/2006 | Pipkin | ............... | A47B 23/00 |
| | | | | 108/25 |
| 9,064,434 B2 * | 6/2015 | Alford | ............... | B60N 3/103 |
| 9,067,682 B2 * | 6/2015 | Pajic | ............... | A47B 23/00 |
| 9,192,214 B2 * | 11/2015 | Gambill | ............... | A45B 23/00 |
| 2002/0185578 A1 * | 12/2002 | Hudson | ............... | B60N 3/002 |
| | | | | 248/311.2 |
| 2009/0033118 A1 * | 2/2009 | Gomez | ............... | B62B 9/12 |
| | | | | 296/37.4 |
| 2011/0132914 A1 * | 6/2011 | Vernes | ............... | A47G 19/06 |
| | | | | 220/575 |
| 2013/0170682 A1 * | 7/2013 | Conrad | ............... | H04R 1/028 |
| | | | | 381/332 |
| 2014/0131530 A1 * | 5/2014 | Webb | ............... | A47G 23/02 |
| | | | | 248/125.1 |
| 2015/0090162 A1 * | 4/2015 | Vlosich | ............... | A45C 11/00 |
| | | | | 108/18 |
| 2015/0291104 A1 * | 10/2015 | Kearney | ............... | B60R 7/04 |
| | | | | 296/37.12 |

\* cited by examiner

TABLETOP MOBILE DEVICE AND BEVERAGE HOLDER

CROSS-REFERENCE TO RELATED APPLICATION

This application claims the benefit of priority of U.S. provisional application No. 62/211,247, filed 28 Aug. 2015, the contents of which are herein incorporated by reference.

BACKGROUND OF THE INVENTION

The present invention relates to electronic device accessories and, more particularly, to an apparatus for holding a beverage container while securing an adjacent mobile electronic device in an upright orientation.

Mobile electronic devices have evolved from luxury, to ubiquity, and on to necessity. Mobile electronic devices such as smart phones are as necessary as a morning cup of coffee. What if you need both such necessities at the same time on the same table top. Well, first, the display of a smart phone cannot be conveniently viewed in a horizontal position on a flat tabletop surface. Furthermore, smart phones leaned up against table items, such as the beverage container, tend to slide off these temporary supports. Currently, there is no table setting to place your mobile device in a convenient upright orientation for viewing purposes.

As can be seen, there is a need for an apparatus for holding a beverage container while securing an adjacent mobile electronic device in an upright orientation.

SUMMARY OF THE INVENTION

In one aspect of the present invention, a retaining apparatus for propping an electronic mobile device in an upright orientation having a body with six quadrilateral faces including a first surface and an opposing second surface; two opposing side faces; and a left face and an opposing right face; a first isosceles-trapezoidal slot recessed in the first surface; and a second isosceles-trapezoidal slot recessed in the second surface.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a retaining apparatus for propping an electronic mobile device in an upright orientation. The retaining apparatus has two planar and opposing surfaces, wherein each surface provides an isosceles-trapezoidal slot. Though the two slots have different widths and lengths to allow for different device widths and lengths, they both provide tapering sidewalls that overhang bottom portions of the associated slot, thereby adapting each slot to selectively engage a peripheral edge of a mobile electronic device between the tapering sidewalls and the overhanging bottom portions, and in turn enabling the propping of the mobile electronic device in an upright orientation. Adjacent to each slot, the retaining apparatus may provide frictionally engaging material for removably securing a beverage container thereto.

Figure 2:
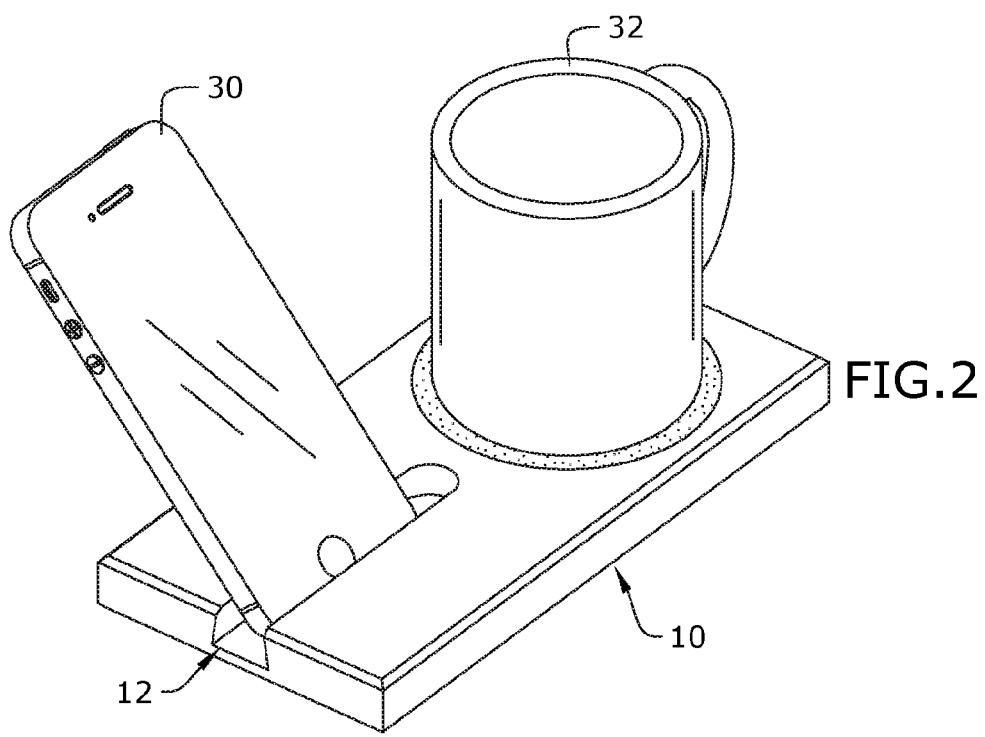
FIG. 2 is a left perspective view of an exemplary embodiment of the present invention, shown in use.
Figure 3:
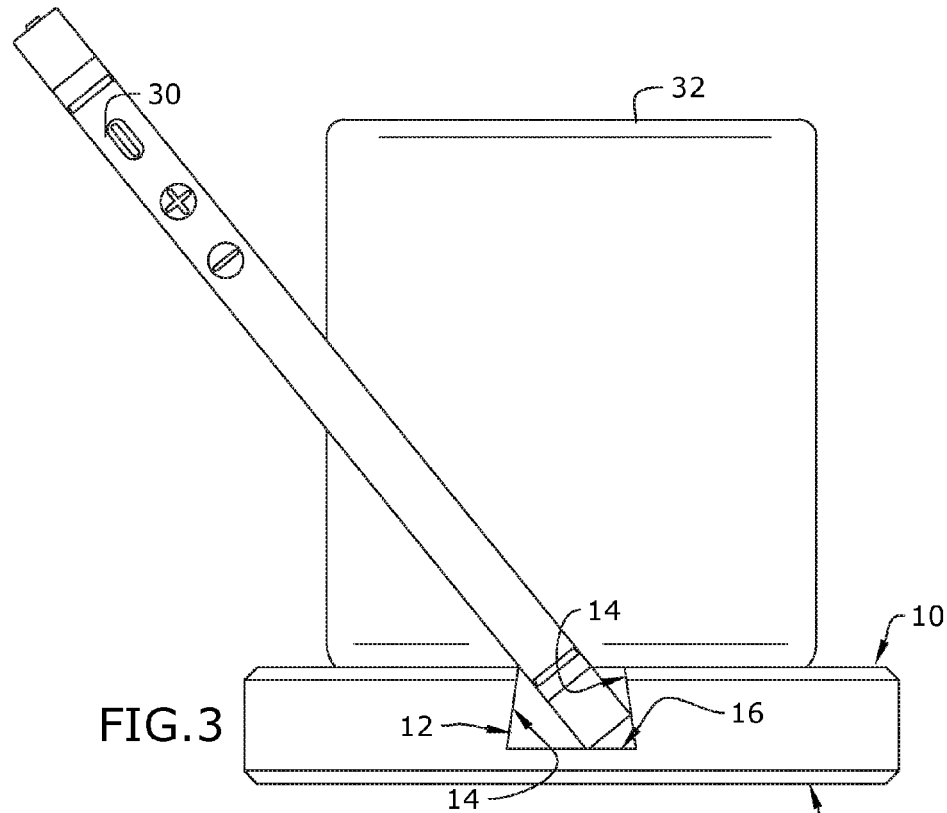
FIG. 3 is a left elevation view of an exemplary embodiment of the present invention, shown in use.
Figure 4:
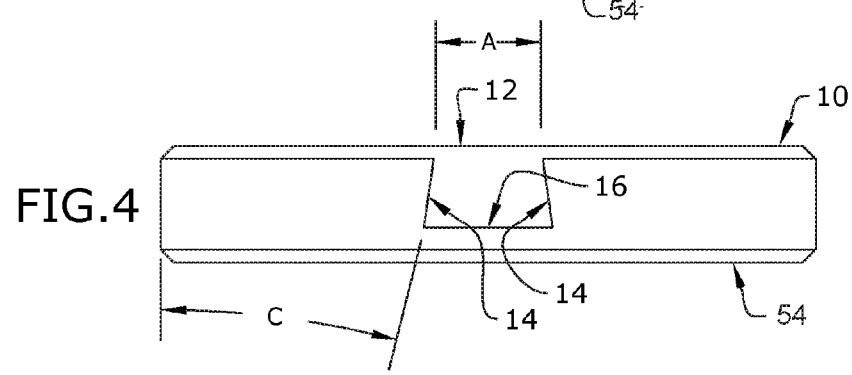
FIG. 4 is a left elevation view of an exemplary embodiment of the present invention.

Referring to FIGS. 1 through 9, the present invention may include a retaining apparatus. The retaining apparatus may include a body 10 forming a generally planar cuboid shape bounded by six quadrilateral faces, extending between two of those quadrilateral faces from a left face 42 to a right face 48 along a longitudinal axis. The remaining four quadrilateral faces defining the cuboid are two opposing side faces 34, a first surface 52 and a second surface 54. The body 10 may be made from a sufficiently rigid material so long as the retaining apparatus functions in accordance with the present invention as described herein. The first surface 52 provides a first notch 12 that extends from the left face 42 along the longitudinal axis. The first notch 12 may be a recessed isosceles-trapezoidal shaped notch, wherein a first slot (width) A is less than a first bottom slot surface (width) 16 so that the interconnecting first slot sidewalls 14 slant toward an adjacent side face 34 as it extends toward the first bottom slot surface 16, as illustrated in FIG. 4. In certain embodiments, the first bottom slot surface (width) 16 may be about 0.625 inches, while the first slot (width) A may be about 0.5 inches, and wherein the angle between the first bottom slot surface 16 and the first slot sidewalls 14 may be approximately 14 degrees.

Figure 1:
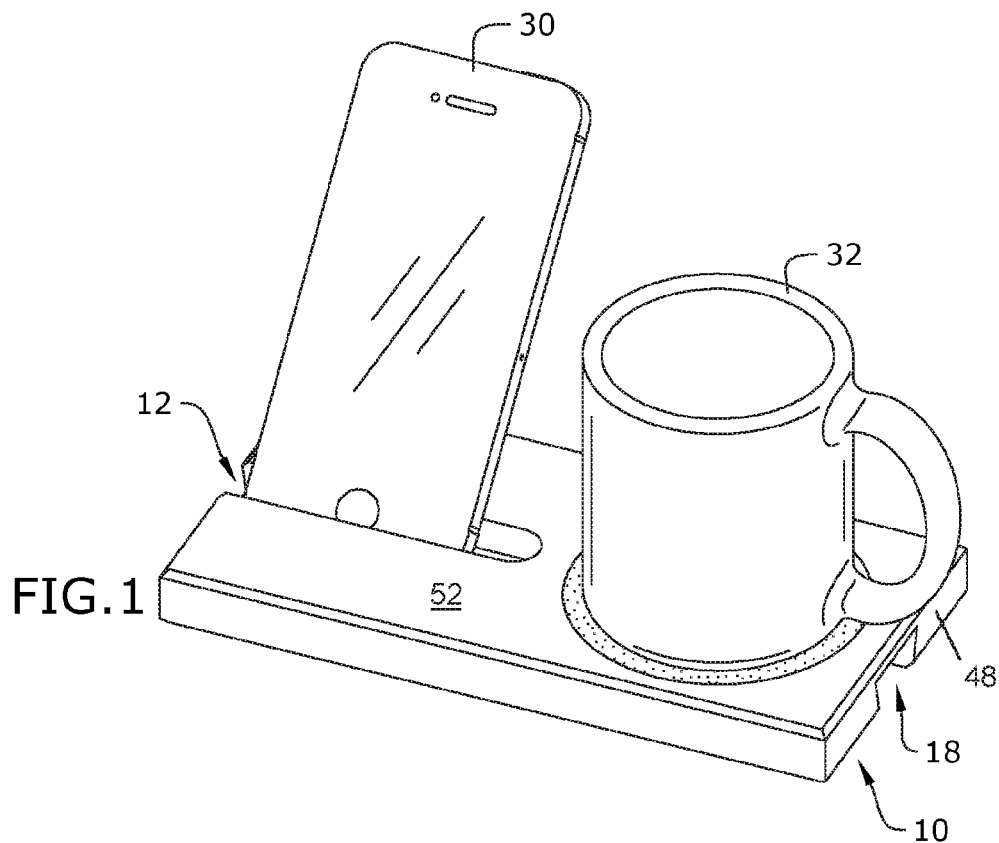
FIG. 1 is a right perspective view of an exemplary embodiment of the present invention, shown in use.

The intersection of a first slot sidewall 14 and the first bottom slot surface 16 may be defined by a first distance C. The isosceles-trapezoidal shape is dimensioned and adapted to prop up a mobile electronic device 30, such as a smart phone, electronic note pad, and the like, in an upright orientation by the resulting overhanging first slot sidewalls 14, as illustrated in FIGS. 1 through 3.

Figure 5:
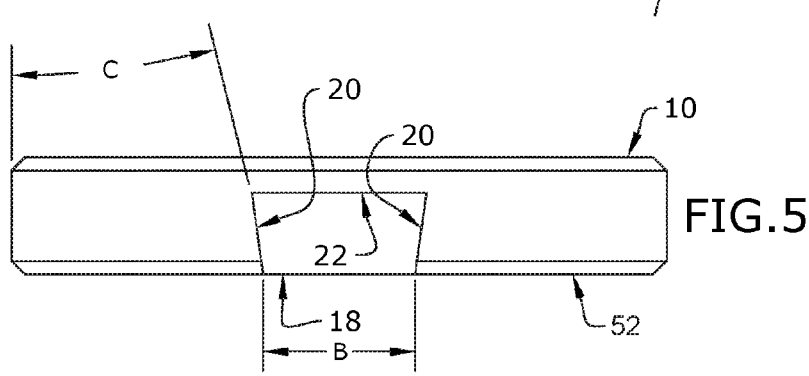
FIG. 5 is a left elevation view of FIG. 4, shown rotated 180 degrees about a longitudinal axis.
Figure 6:
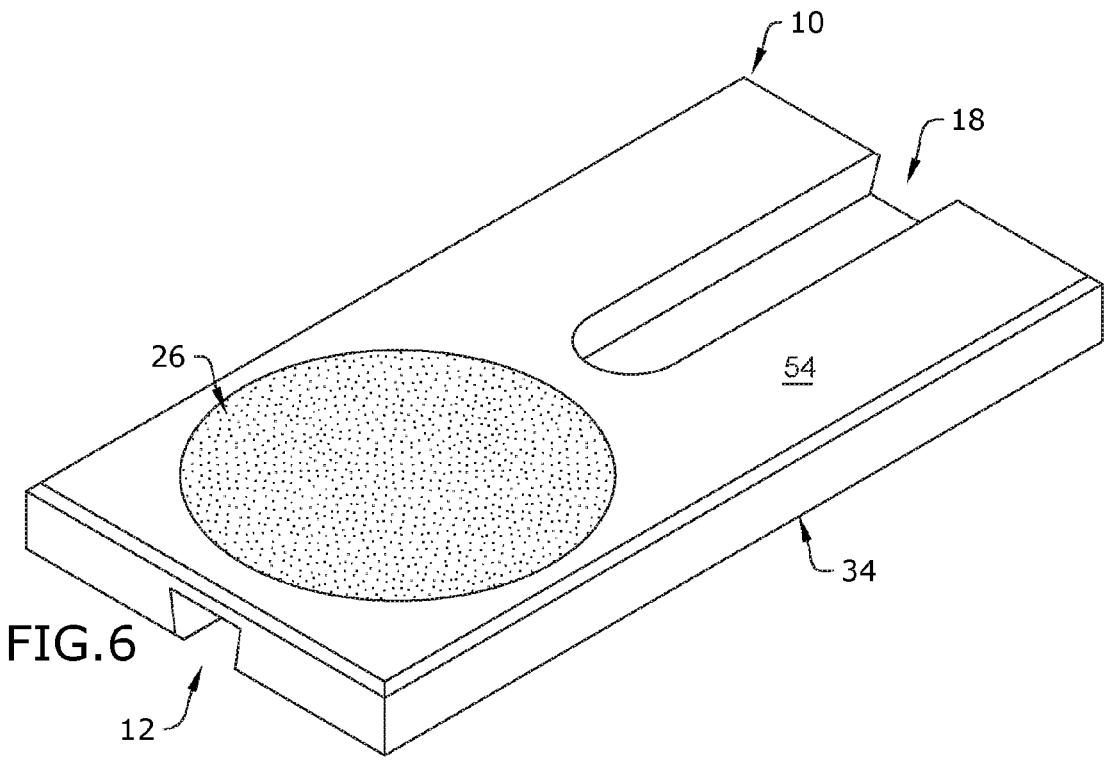
FIG. 6 is a perspective view of an exemplary embodiment of the present invention.
Figure 7:
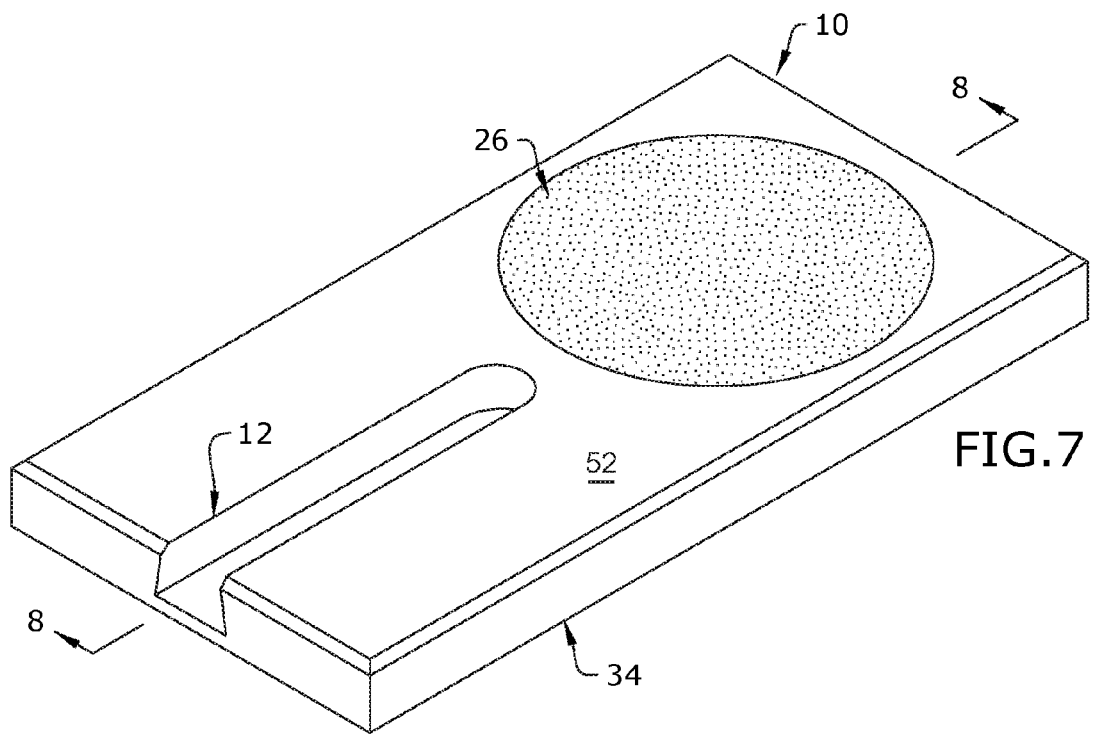
FIG. 7 is a perspective view of FIG. 6, shown rotated 180 degrees about a transverse axis.
Figure 8:
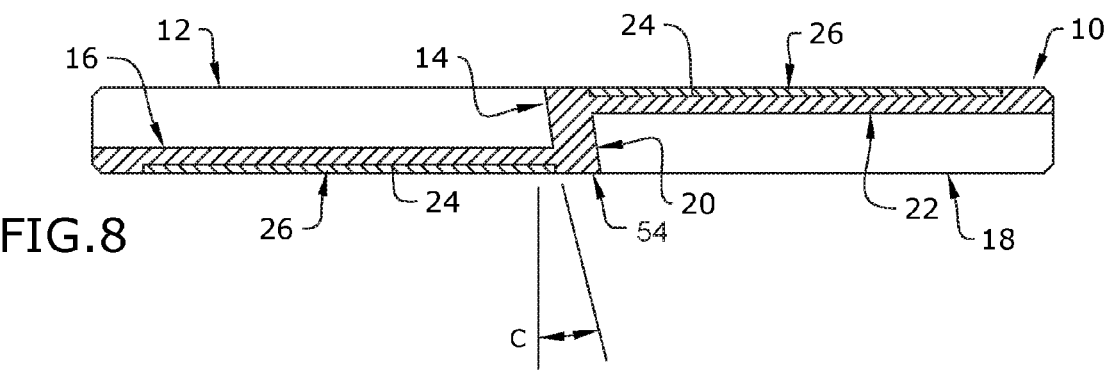
FIG. 8 is a section view of an exemplary embodiment of the present invention, taken along line 8-8 of FIG. 7.
Figure 9:
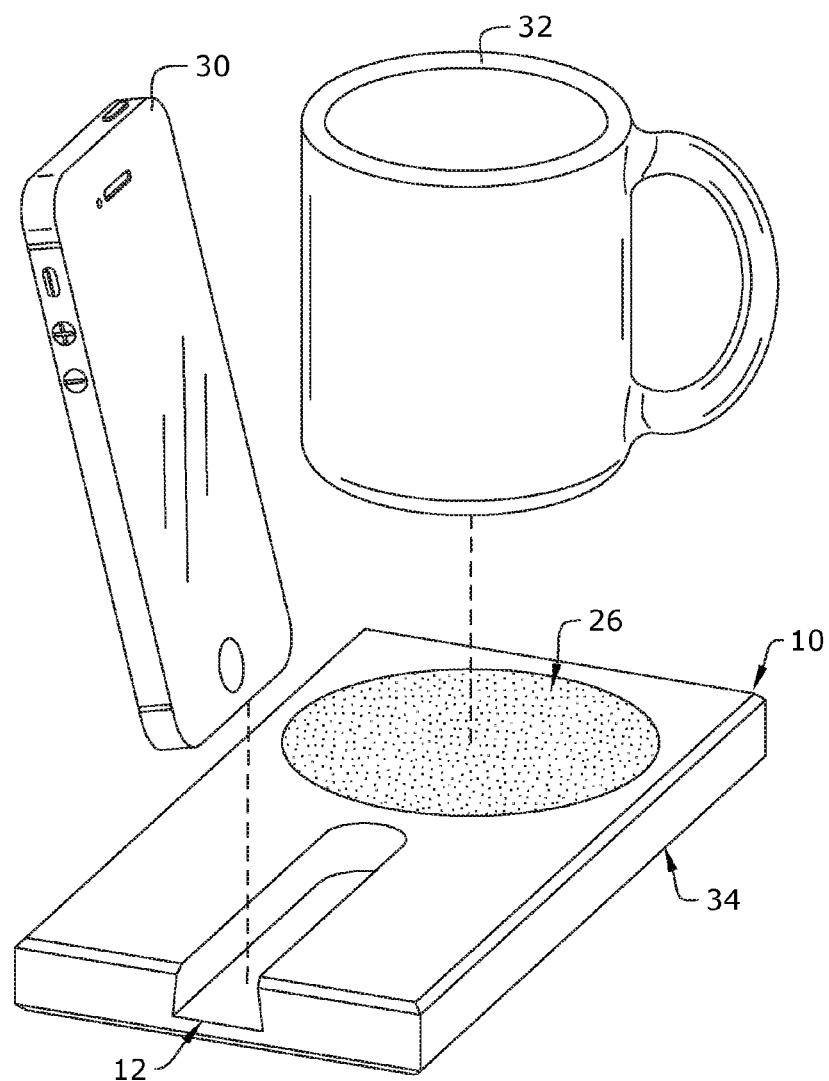
FIG. 9 is an exploded view of an exemplary embodiment of the present invention.

The second surface 54 provides a second notch 18 that extends from the right face 48 along the longitudinal axis. The second notch 18 may be a recessed isosceles-trapezoidal shaped notch, wherein a second slot (width) B is less than a second bottom slot surface (width) 22 so that the interconnecting second slot sidewalls 20 slant toward an adjacent side face 34 as it extends toward the second bottom slot surface 22, as illustrated in FIG. 5—resulting in each slot sidewall 20 overhanging the second bottom slot surface 22. The intersection of a second slot sidewall 20 and the second bottom slot surface 22 may be defined by a second distance C. The isosceles-trapezoidal shape is dimensioned and adapted to prop up a mobile electronic device 30, such as a smart phone, electronic note pad, and the like, in an upright orientation. The second slot B extends farther along the longitudinal axis than the first slot A, thereby offering two slot lengths that a user may choose from depending on the mobile electron device 30 that they want to prop in the upright orientation.

The second slot B has a greater width than the first slot A, thereby offering two angles of upright orientations, a first angle and a second angle of upright orientation, so that a user may choose which angle of upright orientation is preferable depending on the mobile electron device 30 that want to prop in the upright orientation.

Both the first and the second surfaces 52, 54 provide a cork recess 24 dimensioned and adapted to retain a cork inset 26. The cork inset 26 may be adapted to frictionally engage an object 32, such as a beverage container.

The transition between the first and second surfaces 52, 54 and the side faces 34 or the left and right faces 42, 48 may be beveled.

A method of making the present invention may include the following. The body 10 may be planed to a desired thickness, then chamfered, then slotted and counter bored for forming the cork recesses 24 on each of the first and second surfaces 52, 54. The cork inset 26 may be applied to the counter bored cork recesses 24. Finishes and markings applied as necessary.

A method of using the present invention may include the following. The retaining apparatus disclosed above may be provided. The user may place one of the two surface 52, 54 on a supporting surface, such as a tabletop depending on which of the first or second slots A or B they desire to be facing up, opposite the supporting surface. The determination may depend on the mobile electron device 30 that want to prop in the upright orientation, wherein a longer electronic notebook pad may be more suited for the longer second slot B. Propping the mobile electronic device 30 between the opposing slot sidewalls is facilitated by the associated angle of upright orientation and resulting overhang of the slot sidewall, as illustrated in FIG. 3, wherein a share peripheral edge of the mobile electronic device 30 is wedged between the overhang slot sidewall 14 and bottom slot surface 16.

In certain embodiments, the user may place a cup of coffee 32 on the adjacent cork insert 26 so as to enjoy every morning's two necessities side-by-side: coffee and essential content displayed on their mobile electronic device 30.

It should be understood, of course, that the foregoing relates to exemplary embodiments of the invention and that modifications may be made without departing from the spirit and scope of the invention as set forth in the following claims.

What is claimed is:

1. A retaining apparatus for propping an electronic mobile device in an upright orientation, comprising:
   a body comprising six quadrilateral faces comprising:
      a first surface and second surface, wherein the first and second surfaces are disposed on opposing faces of the six quadrilateral faces;
      two opposing side faces; and
      a left face and an opposing right face;
   a first isosceles-trapezoidal slot recessed in the first surface; and
   a second isosceles-trapezoidal slot recessed in the opposing second surface,
   wherein the first isosceles-trapezoidal slot extends from the left face along a longitudinal axis of the body, and wherein the second isosceles-trapezoidal slot extends from the right face along said longitudinal axis.

2. The retaining apparatus of claim 1, wherein the first isosceles-trapezoidal slot communicates with the left face so as to form a left void therein, wherein the left void is coextensive with a periphery of the first isosceles-trapezoidal slot.

3. The retaining apparatus of claim 2, wherein the second isosceles-trapezoidal slot extends along the longitudinal axis farther than the second isosceles-trapezoidal slot.

4. The retaining apparatus of claim 3, wherein the each isosceles-trapezoidal slot comprises two opposing tapered sidewalls overhanging an associated bottom slot surface.

5. The retaining apparatus of claim 4, wherein the bottom slot surface of the second isosceles-trapezoidal slot has a width greater that the bottom slot surface of the first isosceles-trapezoidal slot.

6. The retaining apparatus of claim 5, further comprising a cork insert adjacent to each isosceles-trapezoidal slot.

* * * * *